US009160679B2

(12) United States Patent
Griswold et al.

(10) Patent No.: US 9,160,679 B2
(45) Date of Patent: Oct. 13, 2015

(54) PORT EMPTY TRANSITION SCHEDULING

(71) Applicant: Broadcom Corporation, Irvine, CA (US)

(72) Inventors: Mark David Griswold, Fremont, CA (US); Michael Hei-Lung Lau, Rockville, MD (US)

(73) Assignee: BROADCOM CORPORATION, Irvine, CA (US)

( * ) Notice: Subject to any disclaimer, the term of this patent is extended or adjusted under 35 U.S.C. 154(b) by 87 days.

(21) Appl. No.: 14/041,418

(22) Filed: Sep. 30, 2013

(65) Prior Publication Data

US 2015/0085861 A1 Mar. 26, 2015

Related U.S. Application Data

(60) Provisional application No. 61/881,692, filed on Sep. 24, 2013.

(51) Int. Cl.
*H04L 12/863* (2013.01)
(52) U.S. Cl.
CPC .................... *H04L 47/50* (2013.01)
(58) Field of Classification Search
CPC ...................................... H04L 12/56
USPC .......................... 370/390, 412–429
See application file for complete search history.

(56) References Cited

U.S. PATENT DOCUMENTS 8,295,293 B1* 10/2012 Brown ............ 370/401
2006/0221978 A1* 10/2006 Venkatachalam ........ 370/395.41
2011/0252166 A1* 10/2011 Padala et al. ............ 710/74

* cited by examiner

*Primary Examiner* — Dang Ton
*Assistant Examiner* — Mewale Ambaye
(74) *Attorney, Agent, or Firm* — Oblon, McClelland, Maier & Neustadt, L.L.P.

(57) ABSTRACT

Aspects of port empty transition scheduling are described herein. In one embodiment, when one or more cells are added to a queue in a network communications device, an enqueue indicator is generated. The enqueue indicator identifies a number of cells added to the queue. With reference to the enqueue indicator, a queue scheduler maintains a count of cells enqueued for communication and issues a port pick credit for a port of the network communications device. A port scheduler schedules a pick for communicating over the port with reference to the port pick credit and forwards the pick to the queue scheduler. In turn, the queue scheduler forwards a queue pick to the queue, and at least one of the cells is forwarded to dequeue logic. According to aspects of the embodiments described herein, empty port scheduling inefficiencies may be avoided and network throughput increased.

18 Claims, 7 Drawing Sheets

PORT EMPTY TRANSITION SCHEDULING

CROSS-REFERENCE TO RELATED APPLICATIONS

This application claims the benefit of U.S. Provisional Application No. 61/881,692, filed Sep. 24, 2013, the entire contents of which is hereby incorporated herein by reference.

BACKGROUND

Among other functions, a network component, such as a network router, switch, etc., routes or switches data from a source to a destination. For example, a network switch may receive network packets on one or more input ports and route or switch these packets to one or more output ports. According to various network communications protocols, ingress packets which enter the switch may be scheduled for communication by the switch as egress packets according to suitable packet priorities for reliable data transfer.

In this context, as packets are received, a switch processes the packets according to packet priorities and protocols, so that the packets may be ultimately transmitted toward network destinations. Especially when a network component operates during a time of high packet processing demand, it is important for the network component to operate efficiently. In certain cases, the rate at which data is received by the network component may even exceed the network component's ability to process and transmit that data. In some worst-case situations, a network component may drop packets if the rate at which data is received by the network component exceeds the network component's ability to process and transmit that data and, for example, a buffer or memory overrun occurs.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

Figure 1:
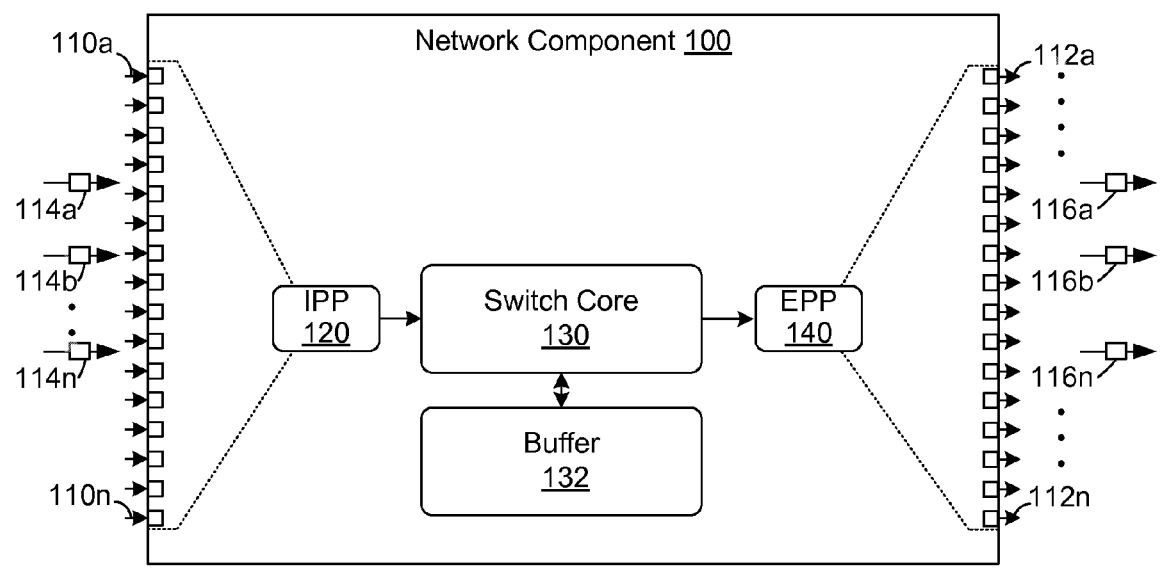
FIG. 1 illustrates an example network component for port empty transition scheduling according to aspects of embodiments described herein.

Among other functions, a network component, such as a network router, switch, etc., routes or switches data from a source to a destination. For example, a network switch may receive network packets on one or more input ports and route or switch these packets to one or more output ports. According to various network communications protocols, ingress packets which enter the switch may be scheduled for communication by the switch as egress packets according to suitable packet priorities for reliable data transfer.

In this context, as packets are received, a switch processes the packets according to packet priorities and protocols, so that the packets may be ultimately transmitted toward network destinations. Especially when a network component operates during a time of high packet processing demand, it is important for the network component to operate efficiently. In certain cases, the rate at which data is received by the network component may even approach or exceed the network component's ability to process and transmit that data. In some worst-case situations, a network component may drop packets if the rate at which data is received by the network component exceeds the network component's ability to process and transmit that data and, for example, a buffer or memory overrun occurs.

One aspect of efficiency for a network component, such as a switch, is the ability of the switch to transmit data efficiently among its physical layer output ports. A switch may include several (e.g., 4, 8, 10, 40, 100, etc.) physical layer ports. Generally, data is scheduled for communication over these ports in a time division manner. That is, a switch may transmit data over individual, respective, ports (i.e., egress ports) over time. As the rate of scheduling and switching among egress ports is increased, it may become difficult for a scheduler of the switch to efficiently handle switching among the egress ports. For example, a scheduler may select an egress port for data communication over multiple consecutive communications cycles, although data may not be available for transmission over each of those cycles for the selected egress port. In other words, a port empty condition may occur for the selected egress port during one or more of the cycles during which the egress port is selected.

The scheduling inefficiencies described above may result in degraded throughput for a switch. Such conditions arise, at least in part, due to empty state update latency in core logic elements of the switch. For example, empty state update latency may occur when a port selection period is less than the scheduler loop latency in the switch. That is, empty state update latency may occur when a port scheduler makes port selections at a rate which is faster than empty states of port queues can be identified and updated for the scheduler. In this case, port empty conditions may waste one or more communications timeslots of the switch.

In various conditions, certain ports (i.e., "aggressor ports") with low demand may appear to be associated with high demand. For example, especially during certain operating conditions, such as when communicating single packets over partial rate ports or high frequency shaping or flow control operating conditions, relatively higher port empty inefficiencies may occur. As another factor, degradation is a function of oversubscription ratio, generally, where higher oversubscription ratios tend toward higher port empty inefficiencies.

It is noted that, at least in part, some of the newest features sought in network switches may be the same ones that aggravate port empty transition inefficiencies. For example, oversubscription and the use of oversubscription buffers may reduce costs of equipment and provide flexibility, but may lead to port empty transition inefficiencies. Similarly, higher port rate switching and multiple-level opportunistic scheduling hierarchies may lead to port empty transition inefficiencies.

In the context described above, aspects of port empty transition scheduling are described herein. In one embodiment, when one or more cells are added to a queue in a network communications device, an enqueue indicator is generated. The enqueue indicator identifies a number of cells added to the queue. With reference to the enqueue indicator, a queue scheduler maintains a count of cells enqueued for communication and issues a port pick credit for a port of the network communications device. A port scheduler schedules a pick for communicating over the port with reference to the port pick credit and forwards the pick to the queue scheduler. In turn, the queue scheduler forwards a queue pick to the queue, and at least one of the cells is forwarded to dequeue logic. According to aspects of the embodiments described herein, empty port scheduling inefficiencies may be avoided and network throughput increased.

Turning now to the drawings, a general description of exemplary embodiments of a network component are provided, followed by a discussion of the operation of the same.

FIG. 1 illustrates an example network communications device or network component 100 for port empty transition scheduling according to aspects of embodiments described herein. The network component 100 may correspond to a switch, a router, a hub, a bridge, or any other network component or device. Generally, the network component 100 is configured, among other things, to route and/or switch data packets among and between network components in a data network. Among other aspects, the network component 100 is configured to receive one or more data packets from a network source and route and/or switch these packets to a network destination. Although the network component 100 is described herein as processing data packets and cells of data packets, it should be appreciated that the concepts described herein are not limited to use with packets or cells of data. That is, the concepts described herein may be relied upon to efficiently operate on any type, style, or metric of data or data container, without limitation.

The network component 100 includes one or more input or ingress ports 110a-110n, one or more output or egress ports 112a-112n, an ingress packet processor 120, a switch core 130, a buffer 132, and an egress packet processor 140. The network component 100 may receive data packets 114a-114n on any of the ingress ports 110a-110n. Further, the network component 100 may transmit data packets 116a-116n on any of the egress ports 112a-112n. As would be understood in the field of art, it is noted that a pair of ingress and egress ports (e.g., 110a and 112a, 110b and 112b, etc.) may be representative of a single physical port of the network component 100 which is operable for both the reception and transmission of data packets. Features and aspects of the elements of the network component 100 are described in further detail below.

It should be appreciated that, although a number of ports are illustrated in the example network component 100 of FIG. 1, the network component 100 may include a fewer or greater number of ports. Further, it should be appreciated that the network component 100 may include other elements, such as circuitry and/or logic elements for rate control, packet inspection, data processing etc., and other supporting circuitry such as power supplies. Additionally, while one ingress packet processor 120 and one egress packet processor 140 are illustrated, the network component 100 may include additional ingress and egress packet processors, along with additional ports.

The network component 100 facilitates data communications by receiving data packets 114a-114n via the ingress ports 110a-110n, determining one or more destinations for the data packets based on header information, for example, of the data packets, and transmitting data packets 116a-116n via the egress ports 112a-112n. In certain cases and to a certain extent, while awaiting transfer to a destination network address, the received data packets 114a-114n are stored in the buffer 132 while associated overhead processing is performed by the switch core 130. The buffer 132 may be relied upon by the network component 100 to store data which is awaiting distribution.

The ingress packet processor (IPP) 120 processes the data packets 114a-114n upon receipt by the network component 100. For example, the IPP 120 may strip payload data from one or more of the data packets 114a-114n, and provide this payload data to the switch core 130. Additionally, the IPP 120 may examine protocol headers associated with the data packets 114a-114n, to gather routing or other information of the data packets 114a-114n, and provide this information to the switch core 130. The IPP 120 may be configured to examine, evaluate, and adhere to protocol control fields, headers, and data syntaxes, such as Transmission Control Protocol (TCP), Internet Protocol (IP), User Datagram Protocol (UDP), Pragmatic General Multicast (PGM) protocol, Internet Group Management Protocol (IGMP), Protocol Independent Multicast (PIM), or other similar data communications protocols, to coordinate operations of the switch core 130 based on protocol control information associated with received data packets. The egress packet processor (EPP) 150 prepares data for outbound transmission via one or more of the output ports 112a-112n. For example, the EPP 150 may append header or other protocol information to payload data, as directed by the switch core 130, so that data may be routed to other downstream network components.

The switch core 130 generally supports operations of the network component 100 such that empty port scheduling inefficiencies are substantially reduced and avoided. As further described below with reference to FIG. 2, the switch core 130 generates an enqueue indicator when one or more packets are added to a queue for one or more of the egress ports 112a-112n. The packets may be added to the queue by the IPP 120, for example. Among other aspects, the enqueue indicator identifies a number of cells of the one or more packets added to the queue. The switch core 130 further maintains a count of cells enqueued for communication over one or more of the egress ports 112a-112n based on the enqueue indicators.

With reference to the count of cells enqueued for communication over the egress ports 112a-112n, the switch core 130 issues one or more port pick credits for ports of the network component 100, over time. As further described below, the port pick credits may be issued based on a number of outstanding port pick credits and/or shape or flow control functions of the network component 100.

The switch core 130 tallies port pick credits and schedules picks for one or more of the egress ports 112a-112n over time with reference to the tallied number of port pick credits available. A pick for a port may be relied upon by the switch core 130 to identify which of the egress ports 112a-112n, for example, is permitted to communicate (e.g., transmit) data during a communications cycle of the network component 100. In response to a pick for one or more of the egress ports 112a-112n, the switch core 130 may decrement the count of cells enqueued for communication over the one or more ports, and forward a queue pick.

According to other aspects of the switch core 130, based on the queue pick, the switch core 130 may forward one or more cells of one or more packets for communication. The one or more cells may be forwarded from the queue to dequeue logic and, ultimately, to an egress data buffer of the EPP 140, for example. Further aspects of the elements, functions, and features of the switch core 130 are described below. Overall, according to aspects of the operation of the switch core 130, the network component 100 may avoid empty port scheduling inefficiencies. Particularly, by reference to available port pick credits, which are credited by a queue scheduler according to the concepts described herein, a port scheduler of the switch core 130 is able to avoid empty port scheduling inefficiencies by selecting only certain ones of the egress ports 112a-112n which have data enqueued for communication.

Figure 2:
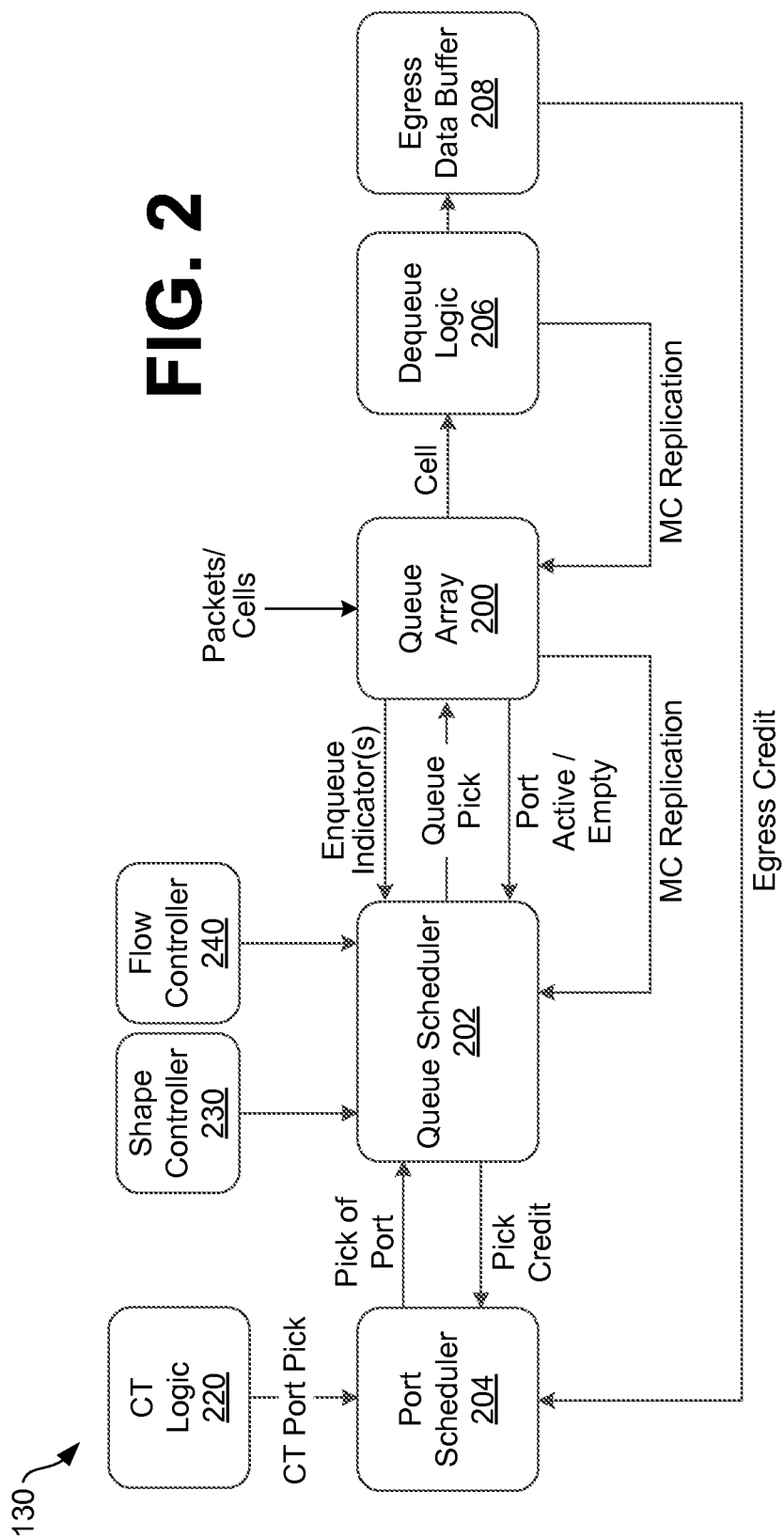
FIG. 2 illustrates example elements in a switch core of the network component of FIG. 1 according to aspects of embodiments described herein.

Turning to FIG. 2, example elements in the switch core 130 of the network component 100 of FIG. 1 are illustrated according to aspects of embodiments described herein. As illustrated in FIG. 2, the switch core 130 includes a queue array 200, a queue scheduler 202, a port scheduler 204, dequeue logic 206, an egress data buffer 208, cut through logic 220, a shape controller 230, and a flow controller 240. In general, the IPP 120 receives packets on the ingress path and updates the queue array 200 (e.g., stores the packets in the queue array 200) based on the received packets.

Each time a packet is added to the queue array 200 for one or more of the ports of the network component 100 (e.g., one or more of the egress ports 112a-112n), an enqueue indicator is generated by the queue array 200 and provided to the queue scheduler 202 as illustrated in FIG. 2. In one embodiment, an enqueue indicator is generated once an end of packet indicator is received for a packet. Each enqueue indicator may identify a number of cells of one or more packets added to the queue array 200. For example, a packet may consist of a certain number of cells, and the enqueue indicator may identify the number of cells. The queue scheduler 202 relies upon the enqueue indicators to maintain a number or count of cells enqueued for communication (e.g., transmission) over the egress ports 112a-112n, by adding or accumulating cells which are enqueued for communication in the queue array 200. In certain embodiments, the queue array 200 may also provide active or empty signals to the queue scheduler 202, per port of the network component 100. The port active signal may indicate to the queue scheduler 202 that at least one cell is stored in the queue array 200 for a port, and the empty signal may indicate to the queue scheduler 202 that no cells are stored in the queue array 200 for the port.

Figure 3:
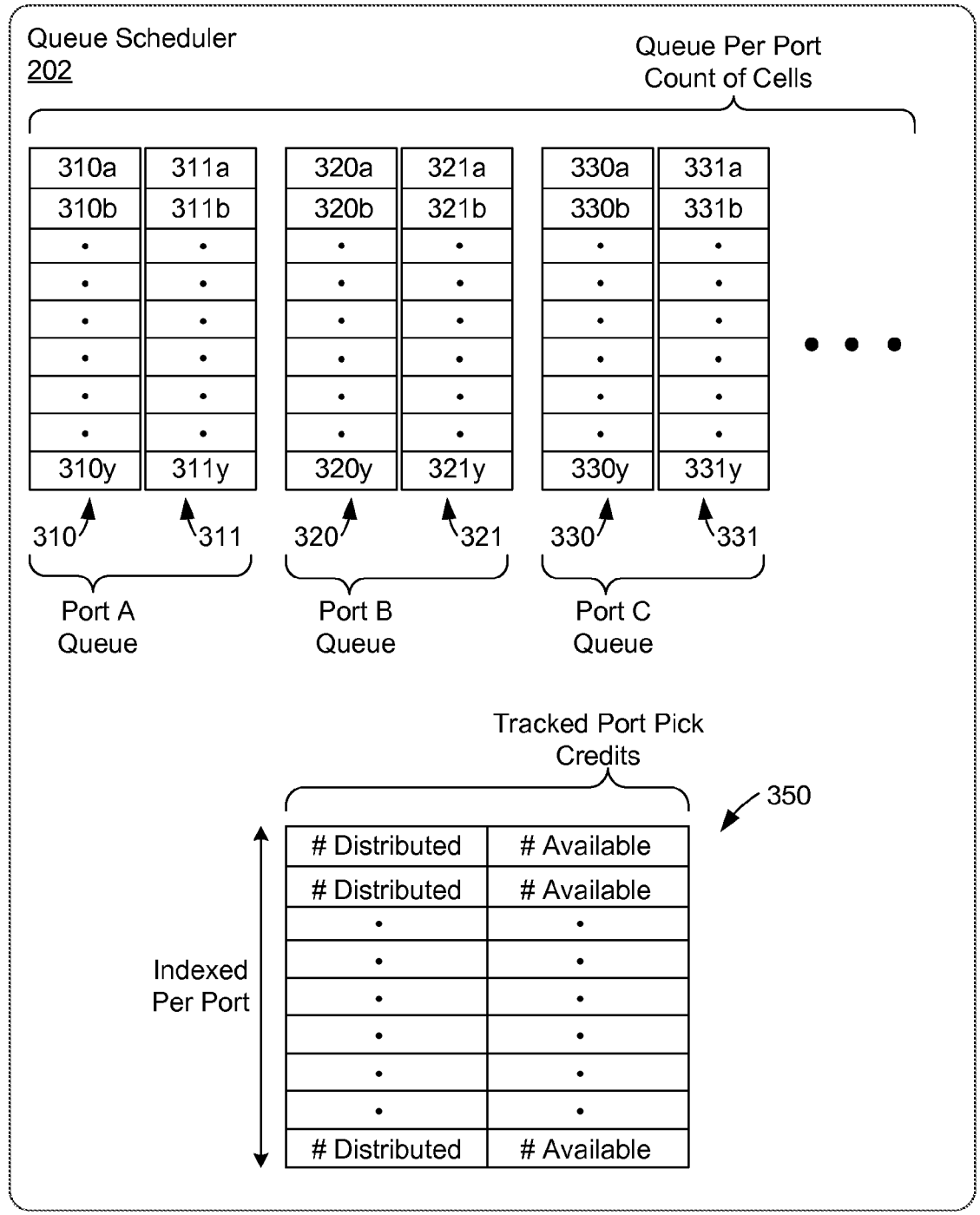
FIG. 3 illustrates an example organization of queues in a queue scheduler of the network component of FIG. 1 according to aspects of embodiments described herein.

FIG. 3 illustrates an example organization of queues in the queue scheduler 202 of the network component 100 of FIG. 1 according to aspects of embodiments described herein. Referring to FIG. 3 for additional context, the queue scheduler 202 includes, in one embodiment, one or more queues for each of the egress ports 112a-112n. For example, the queue scheduler 202 in FIG. 3 includes a unicast queue 310 and a multicast queue 311 for the egress port 112a, a unicast queue 320 and a multicast queue 321 for the egress port 112b, and a unicast queue 330 and a multicast queue 331 for the egress port 112c.

Although not illustrated, the queue scheduler 202 may include additional queues for the remaining egress ports 112d-112n. Here, it is noted that, although one embodiment includes at least one queue for each of the egress ports 112a-112n, the queue scheduler 202 may include a queue for only a certain number of the egress ports 112a-112n. It is further noted that, although one embodiment includes both unicast and multicast queues for the egress ports 112a-112n, the use of only unicast or only multicast queues for individual ones of the egress ports 112a-112n is within the scope and spirit of the embodiments described herein. Generally, a "queue" for a port may include or embody a unicast or a multicast queue for the port, any number of unicast or multicast queues for the port, or any combination thereof.

In one embodiment, the unicast queue 310 includes unicast queues 310a-310y, and the multicast queue 311 includes multicast queues 311a-311y. Further, the unicast queue 320 includes unicast queues 320a-320y, the multicast queue 321 includes multicast queues 321a-321y, the unicast queue 330 includes unicast queues 330a-330y, and the multicast queue 331 includes multicast queues 331a-331y. Referring to FIG. 3, it is noted that, for individual ones of the egress ports 112a-112n, the queue scheduler 202 may include one or more unicast and/or multicast queues. Among embodiments, any unicast or multicast queue for one of the egress ports 112a-112n may be divided or segmented into any suitable number of unicast or multicast queue sections (e.g., sections "a-y" in FIG. 3).

As further described herein, the unicast queues 310, 320, and 330 may be relied upon by the queue scheduler 202 to store and maintain a number or count of cells enqueued for unicast communication over the egress ports 112a, 112b, and 112c, respectively. Further, the multicast queues 311, 321, and 331 may be relied upon by the queue scheduler 202 to store and maintain a number or count of cells enqueued for multicast communication over the egress ports 112a, 112b, and 112c, respectively. Using the unicast and multicast queues of the queue scheduler 202, the queue scheduler 202 may maintain a count of cells, per port, enqueued for unicast and multicast communication by the network component 100.

As outlined above, it is noted that the network component 100 is capable of processing both unicast and multicast packets (and cells of packets). As for identifying a number of cells which have been added to the queue array 200, the number of cells may depend, in part, upon whether unicast or multicast packets have been added to the queue array 200. As described above, the queue array 200 communicates enqueue indicators to the queue scheduler 202 over time, and the enqueue indicators include data representative of numbers of cells added to the queue array 200. It is noted that, in various embodiments, the enqueue indicators may include data representative of numbers of packets (rather than cells) added to the queue array 200.

For unicast packets (i.e., packets designated for communication or transmission to a single destination), the number of cells need only be added to one queue for one port in the queue scheduler 202. On the other hand, for multicast packets (i.e., packets designated for communication or transmission to multiple destinations), a number of cells for the packets may need to be added to multiple queues for one or more ports in the queue scheduler 202.

The network component 100 may be capable of processing both spatial (e.g., level 2 or L2) and logical (e.g., level 3 or L3) multicast packets. In the case of spatial multicast packets, one or more packets and cells of packets are added to queues for one or more ports in the queue scheduler 202, based on multiple "spatial" destinations. In this sense, the switch core 130 may operate on spatial multicast packets as if they were embodied as multiple individual unicast packets.

As for logical L3 multicast replication, rather than identifying multiple destinations of packets and the numbers of cells of the packets at the outset, as in the case for spatial L2 multicast replication, an L3 multicast packet is identified with a replication identifier and the multiple destinations are determined when the packet or packets are prepared for communication over a port. Thus, the number of L3 multicast packets and cells of such packets may not be known (or only known in part) at the time which enqueue indicators are communicated from the queue array 200 to the queue scheduler 202. This may be due, in part, to the nature of L3 multicast replication and changes to L3 forwarding databases based on IGMP join or leave events (i.e., when destination clients join or leave multicast group addresses). In this context, it is noted that the IGMP join or leave events are asynchronous to other processes of the network component 100, and L3 forwarding databases may change over time.

In various embodiments, to account for the case in which a number of L3 multicast packets and cells of such packets are unknown or variable over time, when an L3 multicast packet is added to the queue array 200, the queue array 200 may communicate an enqueue indicator which includes an initial copy count (ICC) of cells for the L3 multicast packet. According to one embodiment, if the ICC is less than a certain predetermined ICC number of cells (e.g., 4-6 cells), then the predetermined number of cells may be identified by an enqueue indicator communicated from the queue array 200 to the queue scheduler 202. Otherwise, if the ICC is greater than the predetermined number, the enqueue indicator may include a special cell count designator, such as a "0" or "null" character. As further described below, the dequeue logic 206 may provide additional multicast replication feedback for cells of L3 multicast packets, upon picks of ports for L3 multicast packet communications. The queue scheduler 202 may accumulate additional numbers of cells according to the feedback.

Referring back to FIGS. 2 and 3, as described above, the queue scheduler 202 maintains, accumulates, or aggregates counts of cells enqueued for communication over the egress ports 112a-112n in the queues 310, 311, 320, 321, 330, 331, etc. Based on the counts of cells, the queue scheduler 202 issues port pick credits to the port scheduler 204 for one or more of the egress ports 112a-112n. In other words, the queue scheduler 202 creates "credited paths" for the egress ports 112a-112n using the port pick credits. The port pick credits are issued to the port scheduler 204 as illustrated in FIG. 3. In one aspect, the queue scheduler 202 tracks a number of port pick credits distributed and available for distribution, for each of the egress ports 112a-112n. In FIG. 3, for example, the queue scheduler 202 stores and maintains a distribution array 350. The distribution array 350 includes a registry of the number of distributed port pick credits and the number of available port pick credits, indexed per port. In general, a sum or total of the number of distributed port pick credits and the number of available port pick credits, per port, is an invariant factor in the queue scheduler 202, although it may vary over time in some embodiments. As one example, the sum may be embodied as 6, 8, or 10 credits, although other numbers are within the scope and spirit of the embodiments described herein (and may vary over time). Also, in various embodiments, the sum may be different among ports. According to certain aspects, the numbers of distributed and available port pick credits, per port, may be configured according to a software- or firmware-based configuration.

Here, it is noted that the queue scheduler 202 may issue port pick credits based on various factors in addition to the counts of cells enqueued for communication over the egress ports 112a-112n. For example, the queue scheduler 202 may issue or refrain from issuing port pick credits based on shape and/or flow control function inputs provided by the shape controller 230 and/or the flow controller 240. For example, the shape controller 230 may be relied upon in the network component 100 to throttle or limit the communication bandwidth associated with one or more of the egress ports 112a-112n or one or more queues of the egress ports 112a-112n. In other variations, the shaper may throttle or limit the communication bandwidth associated with a group of queues of a port or a group of queues among several ports. In this case, the queue scheduler 202 may shape (e.g., bandwidth limit) the issuance of port pick credits for certain throttled ports, although a count of cells enqueued for communication over the throttled ports may be relatively high. Further, the flow controller 240 may be relied upon in the network component 100 to stop or start the communication of cells associated with one or more of the egress ports 112a-112n or one or more queues of the egress ports 112a-112n. In this case, the queue scheduler 202 may stop or start the issuance of port pick credits for certain ports, although a count of cells enqueued for communication over the ports may be relatively high.

Turning to the port scheduler 204 in FIG. 2, the port scheduler 204 may tally the port pick credits received from the queue scheduler 202, respectively for individual ones of egress ports 112a-112n. On the basis of or with reference to the tallied port pick credits, the port scheduler 204 schedules picks among one or more of the egress ports 112a-112n. That is, among the egress ports 112a-112n for which at least one port pick credit is available, the port scheduler 204 may schedule a pick for communicating over individual ones of the "credited" egress ports 112a-112n over time. Generally, picks are scheduled for communicating, per port, over time. For example, picks may be scheduled, per credited port, for individual or respective communication cycles of the network component 100. Here, it is noted that, among credited ones of the egress ports 112a-112n, the selection of each next scheduled pick of a port for communication may be performed or determined according to any suitable logical algorithm for scheduling or selecting ports for communication. When a pick is scheduled for a port, the pick is forwarded back to the queue scheduler 202, as illustrated in FIG. 2, and the port scheduler 204 decrements its own tally of port pick credits for the picked port (as tallied by the port scheduler 204 itself).

Turning to the cut through logic 220 in FIG. 2, it is noted that the port scheduler 204 may schedule picks among one or more of the egress ports 112a-112n based on factors other than or in addition to whether the ports are credited by the queue scheduler 202. For example, rather than scheduling or selecting a pick of one of the egress ports 112a-112n based on a tally of port pick credits (or lack thereof) for the port, the port scheduler 204 may select a port based on a cut through port pick signal from the cut through logic 220. In this case, if one of the egress ports 112a-112n is selected based on the cut through port pick signal, it is not necessary for the port scheduler 204 to decrement the tally of port pick credits for selected the port.

In general, the cut through logic 220 provides a logical means by which the port scheduler 204 may incorporate non-credited picks for ports, as necessary for certain functional operations and features of the network component 100. In this context, it is noted that the network component 100 is adapted to perform using various network communications protocols which, respectively, differ in syntax and operation. For example, in one embodiment, credited paths are relied upon in the network component 100 for packets which have clearly demarcated or delimited ends (e.g., for packets in which end-of-packet indicators are identified). On the other hand, the cut through path associated with the cut through logic 220 may be relied upon for packets for which ends of the packets are not so clearly demarcated or delimited. In certain embodiments, the cut through logic 220 may be omitted from the switch core 130.

Referring again to the queue scheduler 202, in response to a pick for a port received from the port scheduler 204, the queue scheduler 202 may decrement a count of cells enqueued for communication over the port. In other words, in response to a pick for the egress port 112a from the port scheduler 204, for example, the queue scheduler 202 may decrement a count of cells enqueued in the unicast queue 310 or the multicast queue 311, based on the pick. Similarly, the queue scheduler 202 may adjust the distribution of distributed verses available port pick credits in the distribution array 350, to reflect the return of a port pick credit as a pick for a port.

Here, it is noted that, for a port in which a large count of cells (e.g., a count of greater than the total number of distributed and available port pick credits) is enqueued for communication, the queue scheduler 202 may promptly return a port pick credit in response to the receipt of a pick for the port. In this case, while the count of cells enqueued in a queue of the port is decremented by the queue scheduler in response to the pick for the port, it may not be necessary for the queue scheduler to query each queue associated with the port before returning another subsequent port pick credit. In other cases, for a port in which only a few cells (e.g., 1-3 cells, etc.) are enqueued for communication, it may be necessary for the queue scheduler 202 to query each queue (e.g., 310a-310n and 311a-311n) associated with the port before returning one or more subsequent port pick credits, to ensure that additional data cells are still pending communication (i.e., to ensure that the egress port 112a is not empty).

In this context, to help avoid repeated and high-frequency memory access to memories associated with the queues 310, 311, 320, 321, 330, 331, etc. in the queue scheduler 202 (and to avoid the requirement for multi-port memories), significant bit entries of the queues 310, 311, 320, 321, 330, 331 may be queried in an effort to identify whether a minimum number of cells are still pending communication for any given port. For example, it is noted that, when determining whether to distribute another port pick credit for the egress port 112a, the identification of a logically true significant bit entry in the queue 310a may obviate the need to read bit entries from other queues (e.g., 311a, 310b, etc.) before issuing another port pick credit for the egress port 112a, if the logically true significant bit entry is representative of a relatively large count of cells which are still pending for communication.

According to other aspects, in response to a pick for a port received from the port scheduler 204, the queue scheduler 202 forwards a queue pick back to the queue array 200. In turn, based on the queue pick, the queue array 200 forwards a cell for the port from the queue array 200 to the dequeue logic 206 and, ultimately, to the egress data buffer 208. Upon receipt of the cell from the queue array 200, the dequeue logic 206 prepares cells and/or packets for data communication and may perform processes in association or in connection with the EPP 140. Finally, the cells and/or packets are provided to the egress data buffer 208 before being communicated over one of the egress data ports 112a-112n.

In certain embodiments, the egress data buffer 208 may provide one or more egress credits to the port scheduler 204, based on the available amount of memory in the egress data buffer 208. Thus, in addition to scheduling picks for ports based on tallied numbers of port pick credits, the port scheduler 204 may schedule picks for ports in view of available egress credits as provided by the egress data buffer 208. The available egress credits may be monitored by the port scheduler 204, per port, for example, or according to a total amount of memory available in the egress data buffer 208.

According to other aspects of the embodiments, for L3 multicast packets or cells of packets, the dequeue logic 206 determines whether additional multicast copies of the cell are to be generated. In this context, it is noted that the network component 100 is capable of processing both unicast and multicast packets and cells of packets, as described above. For L3 multicast packets, a remaining number of L3 multicast packets and cells of such packets may be determined by the dequeue logic 206 at the time when one or more cells of such packets are forwarded from the queue array 200 to the dequeue logic 206. This practice is, in part, due to the nature of L3 multicast replication and changes to L3 forwarding databases based on IGMP join or leave events.

In this context, when the dequeue logic 206 receives a cell associated with an L3 multicast packet, the dequeue logic 206 dynamically determines whether additional multicast copies of the cell are to be generated. When additional multicast copies of the cell are to be generated, the dequeue logic 206 generates a multicast replication indicator which indicates an additional number of multicast copies of the cell (or that the number is greater than the predetermined ICC number of cells. The communication of the multicast replication indicator is illustrated between the dequeue logic 206 and the queue array 200. In turn, this multicast replication indicator is forwarded from the queue array 200 to the queue scheduler 202. In response to the multicast replication indicator, the queue scheduler 202 adjusts a count of cells enqueued for communication over the port associated with the L3 multicast cell. In this manner, the queue array 200 and the queue scheduler 202 receive feedback from the dequeue logic 206, even in view of the asynchronous IGMP join or leave events relied upon in L3 multicast replication, which impact the number of L3 multicast cells which are to be distributed asynchronously over time.

According to the elements of the switch core 130 described in connection with FIGS. 2 and 3 above, throughput and bandwidth loss due to port empty conditions may be substantially reduced and avoided. In other words, the network component 100 may select or schedule picks for ports more effectively, using credits for ports which are known to have data enqueued for communication, and avoid the selection of ports which have no data enqueued for communication. Further, average latency may be reduced by making additional port scheduling slots available. Power usage may be additionally reduced as compared to the same worst-case scheduling scenarios in conventional network components or communications devices.

Figure 4A:
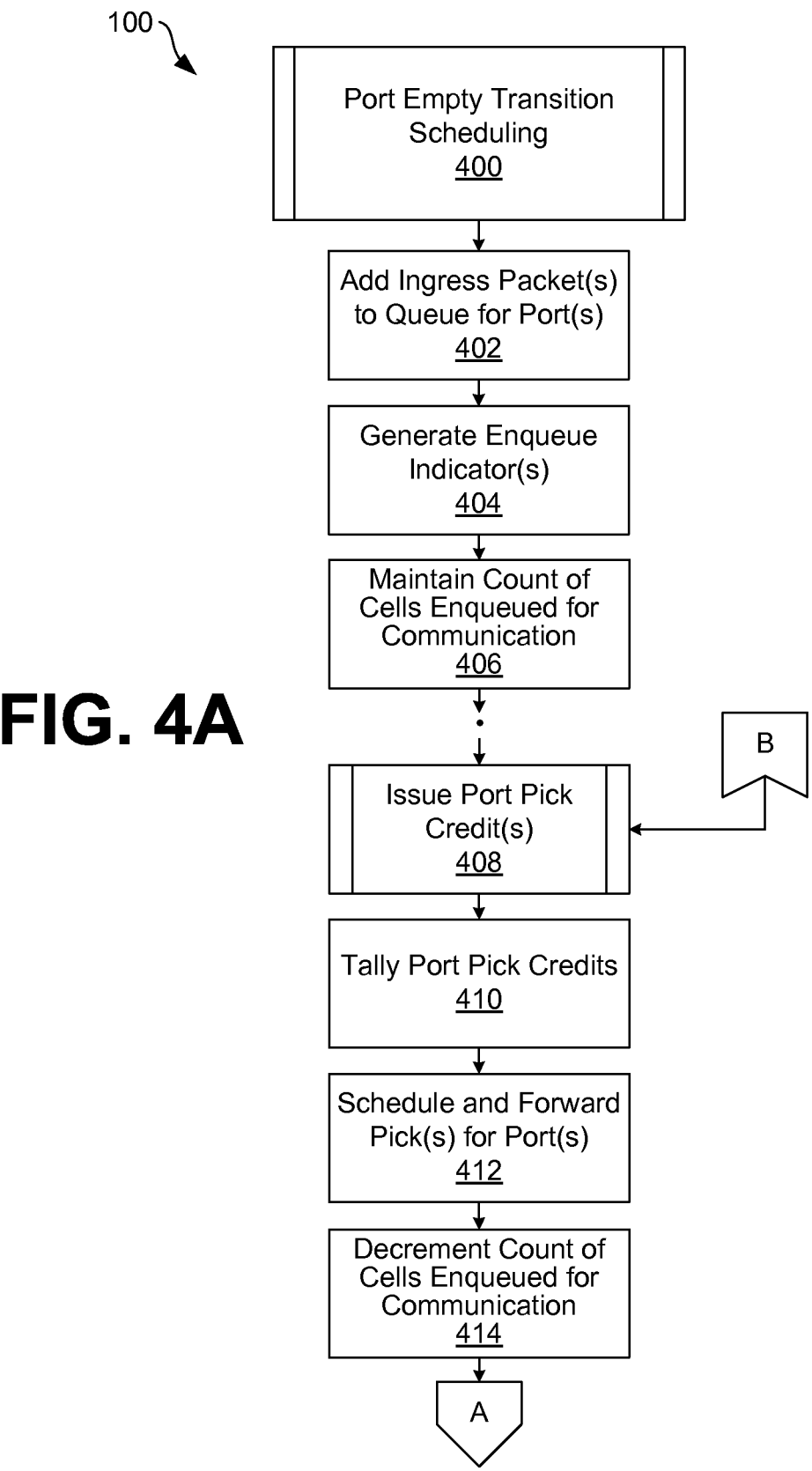
FIG. 4A illustrates an example process flow diagram of a process of empty port transition scheduling performed by the network component of FIG. 1 according to an example embodiment.
Figure 4B:
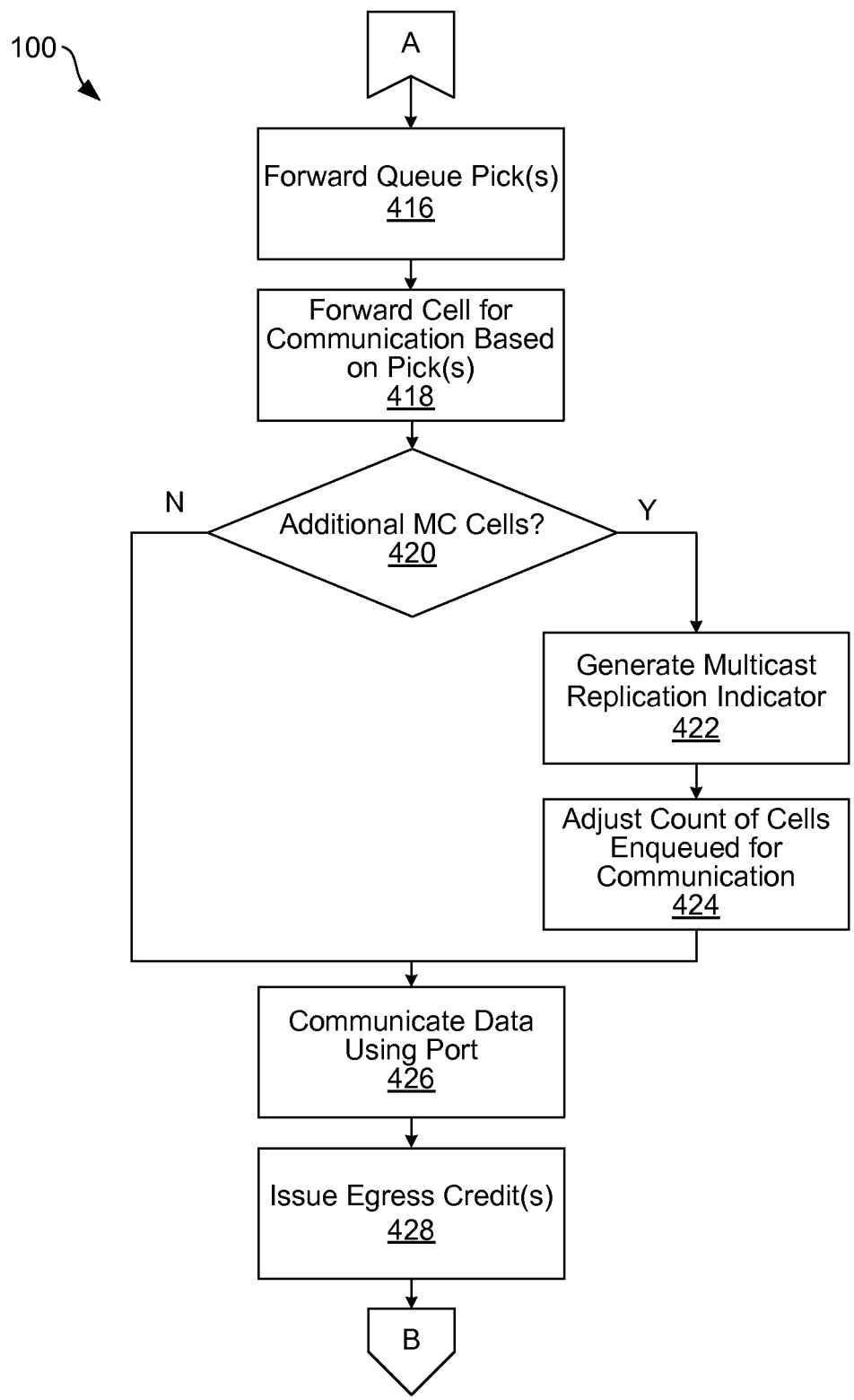
FIG. 4B further illustrates the example process flow diagram of the process of empty port transition scheduling performed by the network component of FIG. 1 according to an example embodiment.
Figure 5:
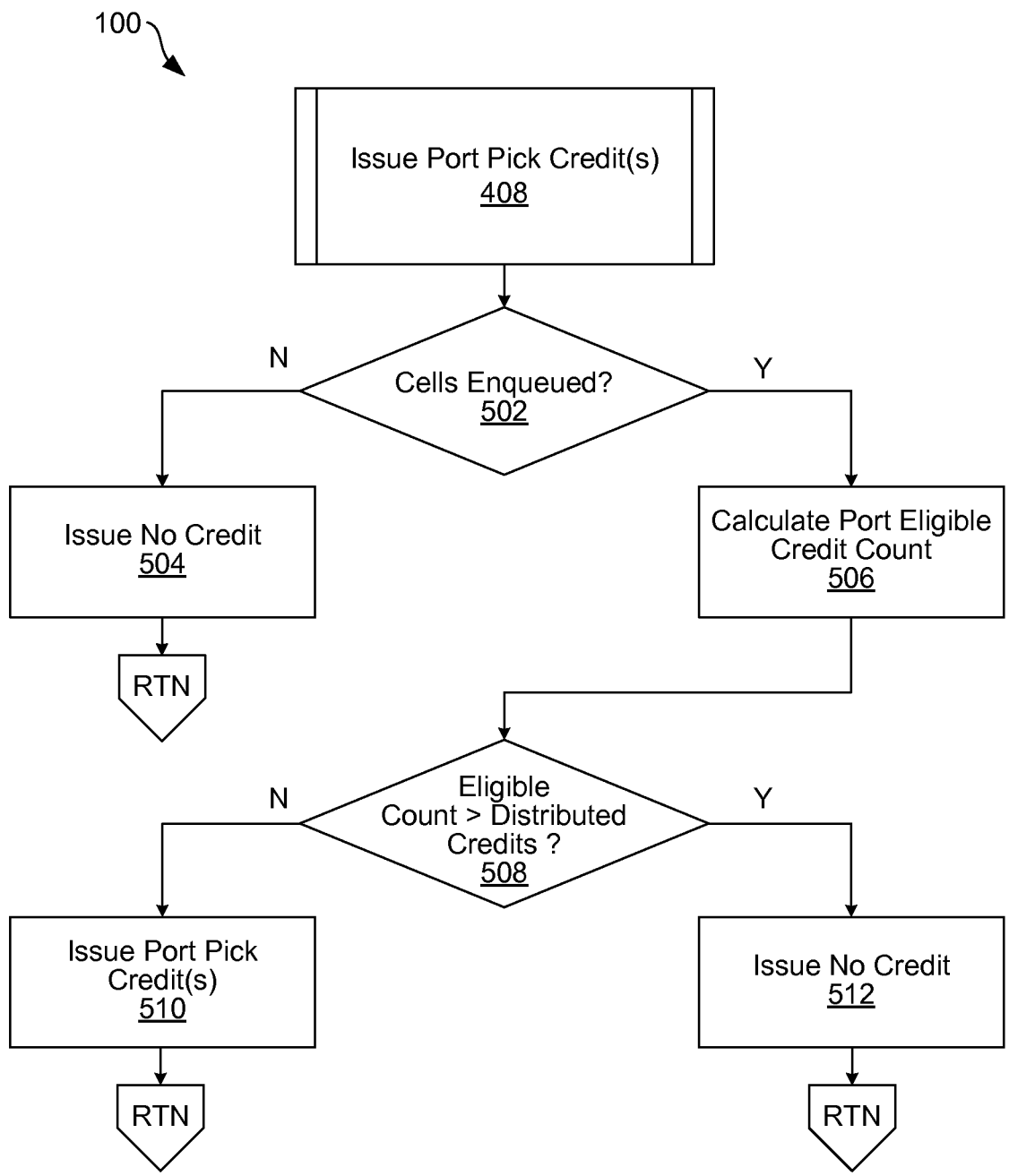
FIG. 5 illustrates an example process flow diagram of a process of issuing port pick credits performed by the network component of FIG. 1 according to an example embodiment.

Referring next to FIGS. 4A, 4B, and 5, process flow diagrams illustrating example processes performed by the network component 100 of FIG. 1 are provided. It is understood that the flowcharts of FIGS. 4A, 4B, and 5 provide merely one example functional arrangement that may be employed to implement the operations of the network component 100, as described herein. In certain aspects, the flowcharts of FIGS. 4A, 4B, and 5 may be viewed as depicting an example of steps performed by the network component 100 according to one or more embodiments. It should be appreciated that the processes illustrated in FIGS. 4A, 4B, and 5 are not limited to occurring once, for a certain number of times, or over any particular period of time. Instead, the processes may continue in an ongoing fashion, as needed, and even repeat over time to embody the concepts described herein.

FIGS. 4A and 4B illustrate an example process flow diagram of a process of empty port transition scheduling performed by the network component of FIG. 1 according to an example embodiment. It should be appreciated that, although the processes below are described in connection with the network component 100 of FIGS. 1 and 2, other network components or communications devices may perform the processes of FIGS. 4A and 4B. Starting at reference numeral 402, the process 400 includes adding one or more packets to a queue for one or more ports. For example, as described above, the data packets 114*a*-114*n* may be received on any of the ingress ports 110*a*-110*n*, and these packets may be processed by the IPP 120 and stored in the queue array 200 (FIG. 2) at reference numeral 402.

At reference numeral 404, the process 400 includes generating one or more enqueue indicators, each of which identifies a number of cells of one or more packets which were added to the queue at reference numeral 402. As described above, the one or more enqueue indicators may be generated by the queue array 200 and forwarded to the queue scheduler 202. The enqueue indicators may identify both a number of cells per packet and a port associated with the cells, for example. The enqueue indicators may additionally identify whether the cell or cells of the one or more packets are associated with unicast or multicast communications.

At reference numeral 406, based on the one or more enqueue indicators generated and forwarded at reference numeral 404, the process 400 includes maintaining, accumulating or aggregating a count of cells enqueued for communication over one or more ports. For example, at reference numeral 406, the queue scheduler 202 may maintain a count of cells enqueued for communication over the egress ports 112*a*-112*n* of the network component 100.

At reference numeral 408, the process 400 includes issuing one or more port pick credits for one or more ports, based on the count of cells, per port, maintained at reference numeral 406. The process of issuing port pick credits at reference numeral 408 may be based further on a number of outstanding port pick credits, per port, and shape and flow control functions. For example, with reference to the distribution array 350 of FIG. 3, as described above, the queue scheduler 202 may issue port pick credits based on a sum or total number of distributed and available port pick credits, per port. Similarly, the queue scheduler 202 may issue port pick credits based on shape and/or flow control functions, as directed by the shape controller 230 and/or the flow controller 240, to implement bandwidth throttling and/or control features of the network component 100. As described above, the queue scheduler 202 may issue the port pick credits to the port scheduler 204. Further aspects of the processes performed at reference numeral 408 are described with reference to FIG. 5 below.

At reference numeral 410, the process 400 includes tallying one or more port pick credits for one or more ports, to determine a number of port pick credits available for the one or more ports, respectively. For example, the port scheduler 204, which receives port pick credits from the queue scheduler 202, may tally the port pick credits, respectively, for the egress ports 112*a*-*n* of the network component 100.

At reference numeral 412, the process 400 includes scheduling one or more picks for one or more ports. The scheduling of each pick for a port may be made with reference to the tallied number of port pick credits available for the port which was picked. For example, as described herein, the port scheduler 204 relies upon the tallied numbers of port pick credits when scheduling the selection of picks for ports. Each pick for a port is also forwarded at reference numeral 412. According to the embodiments described above, the port scheduler 204 forwards each pick for a port to the queue scheduler 202. At reference numeral 412, the process 400 may further include decrementing the tallied number of port pick credits for each port which was picked. In other words, the port scheduler 204 may decrement a tallied number of port pick credits for a port which was picked at reference numeral 412. In this manner, each time a port is picked, a number of available credits for picking that port are reduced.

At reference numeral 414, the process 400 includes decrementing a count of cells enqueued for communication over the port which was picked at reference numeral 412. For example, the queue scheduler 202 may decrement a count of cells in an associated queue for the port which is picked at reference numeral 412.

Turning to FIG. 4B, at reference number 416, the process 400 includes forwarding one or more queue picks based on the one or more picks for the one or more ports scheduled that reference 412. Here, the queue scheduler 202 may forward the one or more queue picks to the queue array 200. In turn, at reference numeral 418, the process 400 includes forwarding or dequeuing one or more cells of one or more packets based on the queue picks forwarded at reference numeral 416. As described above with reference to FIG. 2, the queue array 200 may forward one or more cells to the dequeue logic 206 at reference numeral 418.

At reference numeral 420, the process 400 includes determining whether additional multicast copies of the one or more cells forwarded at reference numeral 408 are to be generated. For example, the dequeue logic 206 may determine whether additional multicast copies are to be generated. It is again noted that the network component 100 is capable of processing both unicast and multicast packets and cells of packets. For L3 multicast packets, a remaining number of L3 multicast packets and cells of such packets may be determined by the dequeue logic 206 at the time when one or more cells of such packets are forwarded from the queue array 200 to the dequeue logic 206 (i.e., after reference numeral 418).

When additional multicast copies are to be generated, the process 400 proceeds to reference 422, which includes generating a multicast replication indicator that indicates an additional number of multicast copies of one or more cells. As illustrated in FIG. 2, the dequeue logic 206 may forward the multicast replication indicator to the queue array 200, and the queue array 200 may forward the multicast replication indicator to the queue scheduler 202. At reference numeral 424, the process 400 includes, in response to the multicast replication indicator, adjusting a count of cells enqueued for communication over one or more ports. Here, queue scheduler 202, after receiving the multicast replication indicator from the dequeue logic 206, may update a count of cells enqueued for communication in association with one or more of the egress ports 112*a*-112*n*, as described herein, based on the multicast replication indicator. After reference numeral 424, the process 400 proceeds to reference numeral 426.

When it is determined at reference numeral 420 that no additional multicast copies are to be generated, the process 400 proceeds from reference numeral 420 to reference numeral 426. At reference numeral 426, the process 400 includes communicating data using at least one physical layer port during a communications cycle. For example, at reference numeral 426, the network component 100 may create data from the egress data buffer 208 using at least one of the egress ports 112*a*-112*n* during a communications cycle of the network component 100. Additionally, as described above, at reference numeral 428, the process 400 may include issuing one or more egress credits. The egress credits may be issued from the egress data buffer 208 to the port scheduler 204. The port scheduler 204 may reference the egress credits when selecting picks for ports.

After reference numeral 428 in FIG. 4B, it may be considered that the process 400 proceeds back to reference numeral 408 in FIG. 4A, for example, for issuing additional port pick credits by the queue scheduler 202. However, because the processes illustrated among FIGS. 4A and 4B may occur, at least in part, in parallel with each other (and by respective circuit and/or logical elements in the switch core 130), it may be considered that the respective elements of the entire process 400 are concurrent and ongoing over time.

Turning to FIG. 5, the process of issuing port pick credits at reference numeral 408 in FIG. 4 is described in additional detail. Generally, the process of issuing port pick credits may be performed by the queue scheduler 202 (FIG. 2), with reference to counts of credits enqueued for communications, per port, as described above with reference to FIG. 3. It is noted that the processes illustrated in FIG. 5 may be performed, per egress port 112a-112n, for example, in an ongoing fashion by the queue scheduler 202.

At reference numeral 502, the process includes determining whether one or more cells are enqueued for a port. If no cells are enqueued, then the process proceeds to reference numeral 504, where it is determined that no port pick credits will be issued for the port. Alternatively, if cells are enqueued, the process proceeds to reference numeral 506, which includes calculating a port eligible credit count. Here, the queue scheduler 202 calculates a number of port pick credits for which a port is eligible. For example, if several cells are enqueued for communication for a port, the queue scheduler 202 may calculate the number of eligible port pick credits as the total count of cells enqueued for communication for the port.

At reference numeral 508, the process includes determining whether the number of eligible port pick credits is greater than the number of distributed credits for the port. For example, as described above, the queue scheduler 202 may maintain a registry of the number of distributed port pick credits and the number of available port pick credits, indexed per port, in the distribution array 350 (FIG. 3). If, at reference numeral 508, it is determined that the number of eligible port pick credits is greater than the number of distributed credits for the port, then the process proceeds to reference 512, where it is determined that no port pick credits will be issued for the port.

On the other hand, if it is determined that the number of eligible port pick credits is less than the number of distributed credits at reference 508, then the process proceeds to reference 510, which includes issuing one or more port pick credits. Here, the queue scheduler 202 may issue the one or more port pick credits to the port scheduler 204. The number of port pick credits issued at reference 510 may depend upon the sum or total of the number of distributed port pick credits and the number of available port pick credits, according to the distribution array 350, which may be an invariant factor in the queue scheduler 202, as described above.

According to the processes described in connection with FIGS. 4A, 4B, and 5 above, throughput and bandwidth loss due to port empty conditions may be substantially reduced and avoided in network components or communications devices. In other words, picks for ports may be more effectively selected or scheduled, using credits for ports which are known to have data enqueued for communication. Further, average latency may be reduced by making additional port scheduling slots available. Power usage may be additionally reduced as compared to the same worst-case scheduling scenarios in conventional network components or communications devices.

Figure 6:
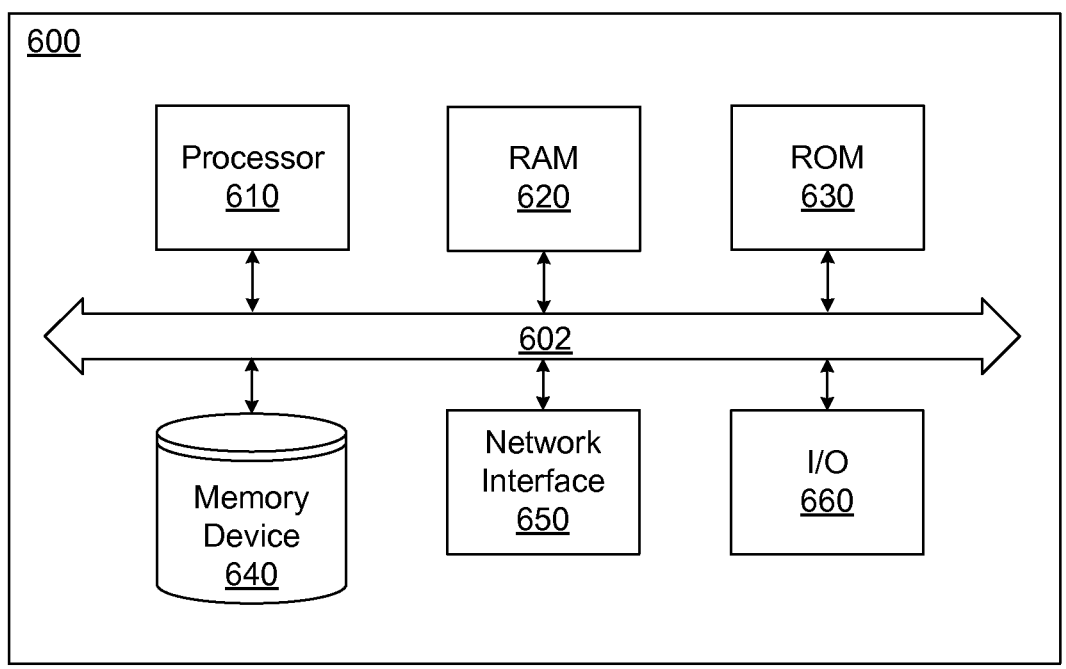
FIG. 6 illustrates an example schematic block diagram of a computing architecture that may be employed by the network component of FIG. 1 according to various embodiments described herein.

FIG. 6 illustrates an example schematic block diagram of a computing device 600 that may be employed by the network component 100 of FIG. 1 according to various embodiments described herein. The computing device 600 may be embodied, in part, using one or more elements of a general purpose computer. The computing device 600 includes a processor 610, a Random Access Memory ("RAM") 620, a Read Only Memory ("ROM") 630, a memory device 640, a network interface 650, and an Input Output ("I/O") interface 660. The elements of computing device 600 are communicatively coupled via a bus 602. The elements of the computing device 600 are not intended to be limiting in nature, as the device may further include other elements.

In various embodiments, the processor 610 may comprise any well-known general purpose arithmetic processor, state machine, or Application Specific Integrated Circuit ("ASIC"), for example. In one embodiment, incoming packets, such as those packets received by the input ports 110a-110n (FIG. 1), are processed by the processor 610. The processor 610 may include one or more circuits, one or more microprocessors, ASICs, dedicated hardware, or any combination thereof. In certain aspects embodiments, the processor 610 is configured to execute one or more software modules. The processor 610 may further include memory configured to store instructions and/or code to various functions, as further described herein. In certain embodiments, the processor 610 may comprise a state machine or ASIC, and the processes described in FIGS. 6 and 7 may be implemented or executed by the state machine or ASIC according to a specialized or embedded circuitry design, by firmware, or a combination of a circuitry and firmware.

The RAM and ROM 620 and 630 comprise any well-known random access and read only memory devices that store computer-readable instructions to be executed by the processor 610. The memory device 640 stores computer-readable instructions thereon that, when executed by the processor 610, direct the processor 610 to execute various aspects of the embodiments described herein.

As a non-limiting example group, the memory device 640 comprises one or more of an optical disc, a magnetic disc, a semiconductor memory (i.e., a semiconductor, floating gate, or similar flash based memory), a magnetic tape memory, a removable memory, combinations thereof, or any other known memory means for storing computer-readable instructions. The network interface 650 comprises hardware interfaces to communicate over data networks. The I/O interface 660 comprises device input and output interfaces such as keyboard, pointing device, display, communication, and/or other interfaces. The bus 602 electrically and communicatively couples the processor 610, the RAM 620, the ROM 630, the memory device 640, the network interface 650, and the I/O interface 660, so that data and instructions may be communicated among them.

In certain aspects, the processor 610 is configured to retrieve computer-readable instructions and data stored on the memory device 640, the RAM 620, the ROM 630, and/or other storage means, and copy the computer-readable instructions to the RAM 620 or the ROM 630 for execution, for example. The processor 610 is further configured to execute the computer-readable instructions to implement various aspects and features of the embodiments described herein. For example, the processor 610 may be adapted or configured to execute the processes described above with reference to FIGS. 4A, 4B, and 5. In embodiments where the processor 610 comprises a state machine or ASIC, the processor 610 may include internal memory and registers for maintenance of data being processed.

The flowcharts or process diagrams of FIGS. 4A, 4B, and 5 are representative of certain processes, functionality, and operations of embodiments described herein. Each block may represent one or a combination of steps or executions in a process. Alternatively or additionally, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as the processor 610. The machine code may be converted from the source code, etc. Further, each block may represent, or be connected with, a circuit or a number of interconnected circuits to implement a certain logical function or process step.

Although the flowcharts or process diagrams of FIGS. 4A, 4B, and 5 are illustrated as having an order, it should be appreciated that the embodiments described herein may operate according to an alternative order. For example, an order of execution of two or more blocks may be scrambled relative to the order shown. Also, two or more blocks shown in succession in FIGS. 4A, 4B, and 5 may be executed concurrently or with partial concurrence. Further, in some embodiments, one or more of the blocks shown in FIGS. 4A, 4B, and 5 may be skipped or omitted. The processes in FIGS. 4A, 4B, and 5 may also continue to operate over time in one or more decision directed cycles of operation, as needed. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Although embodiments have been described herein in detail, the descriptions are by way of example. The features of the embodiments described herein are representative and, in alternative embodiments, certain features and elements may be added or omitted. Additionally, modifications to aspects of the embodiments described herein may be made by those skilled in the art without departing from the spirit and scope of the present invention defined in the following claims, the scope of which are to be accorded the broadest interpretation so as to encompass modifications and equivalent structures.

The invention claimed is:

1. A method for scheduling, comprising: generating, by a queue circuit of a network communications device when one or more cells are added to a queue in the network communications device, an enqueue indicator which identifies a number of the cells added to the queue; maintaining, a queue scheduler circuit, a count of cells enqueued for communication according to the enqueue indicator; generating, by the queue circuit when a first cell of the cells is a multicast cell, a multicast replication indicator that indicates an additional number of multicast copies of the first cell; and adjusting, by the queue scheduler circuit, the count of cells enqueued for communication according to the replication indicator; issuing, by the queue scheduler circuit, a port pick credit for a port of the network communications device based on the adjusted count of cells enqueued for communication; tallying, by a port scheduler circuit, the port pick credit to determine a number of port pick credits available for the port; and scheduling, by the port scheduler circuit, a pick of a port of the network communications device for communication according to the number of port pick credits available.

2. The method of claim 1, further comprising forwarding, by the port scheduler circuit, the pick to at least one of the queue scheduler circuit or the queue.

3. The method of claim 1, wherein issuing the port pick credit comprises issuing, by the queue scheduler circuit, the port pick credit according to a number of outstanding port pick credits for the port and shape and flow control functions associated with the port.

4. The method of claim 1, further comprising decrementing, by the port scheduler circuit after scheduling the pick for communicating over the port, the number of port pick credits available for the port.

5. The method of claim 1, further comprising: decrementing, by the port scheduler circuit in response to the pick for communicating over the port, the count of cells enqueued for communication; and forwarding a queue pick to the queue based on the pick for communicating over the port.

6. The method of claim 5, further comprising, in response to the queue pick, forwarding at least one cell from the queue to dequeue logic.

7. The method of claim 1, further comprising determining whether additional multicast copies of the cell are to be generated.

8. A device core for scheduling, comprising: a queue circuit that generates, when one or more cells are added to a queue of a network communications device, an enqueue indicator that identifies a number of the cells added to the queue; and generates, when a first cell of the cells is a multicast cell, a multicast replication indicator that indicates an additional number of multicast copies of the first cell a queue scheduler circuit that maintains a count of cells enqueued for communication in the network communications device according to the enqueue indicator; adjusts the count of cells enqueued for communication according to the replication indicator; and issues a port pick credit for a port of the network communications device based on the adjusted count of cells enqueued for communication; and a port scheduler circuit that tallies the port pick credit to determine a number of port pick credits available for the port; and schedules a pick of a port of the network communications device for communication according to the number of port pick credits available.

9. The device of claim 8, wherein the port scheduler circuit further forwards the pick for communicating over the port to the queue scheduler circuit.

10. The device of claim 8, wherein the queue scheduler circuit issues the port pick credit based further on a number of outstanding port pick credits for the port and shape and flow control functions associated with the port.

11. The device of claim 8, wherein, after the port scheduler circuit schedules the pick for communicating over the port, the port scheduler circuit further decrements the number of port pick credits available for the port.

12. The device of claim 8, wherein, in response to the pick for communicating over the port, the queue scheduler circuit decrements the count of cells enqueued for communication and forwards a queue pick to a queue.

13. The device of claim 12, comprising, wherein the queue forwards a cell to a dequeue logic circuit in response to the queue pick.

14. The device of claim 13, wherein the dequeue logic determines whether additional multicast copies of the cell are to be generated.

15. A method for scheduling, comprising: generating, by a queue circuit of a network communications device when a packet is added to a queue for a port of the network communications device, an enqueue indicator which identifies a count of a number of cells of the packet; generating, by the queue circuit when a first cell of the cells is a multicast cell, a multicast replication indicator that indicates an additional number of multicast copies of the first cell; and adjusting, by the queue scheduler circuit, the count of cells enqueued for communication according to the replication indicator; issuing, by a queue scheduler circuit, a port pick credit for the port based on the adjusted count of cells enqueued for communication over the port; tallying, by a port scheduler circuit, the port pick credit to determine a number of port pick credits available for the port scheduling, with the port scheduler circuit, a pick of a port of the network communications device for communication according to the number of port pick credits available; and decrementing, by the queue scheduler circuit in response to the pick for communicating over the port, the count of cells enqueued for communication over the port.

16. The method of claim 15, wherein issuing the port pick credit comprises issuing, by the queue scheduler circuit, the port pick credit based according to a number of outstanding port pick credits for the port and shape and flow control functions associated with the port.

17. The method of claim 15, further comprising: forwarding a queue pick to the queue; in response to the queue pick, forwarding at least one cell from the queue to dequeue logic; and determining whether additional multicast copies of the cell are to be generated.

18. The device core of claim 8, wherein the queue scheduler determines whether additional multicast copies of the cell are to be generated.

\* \* \* \* \*

UNITED STATES PATENT AND TRADEMARK OFFICE
CERTIFICATE OF CORRECTION

PATENT NO. : 9,160,679 B2
APPLICATION NO. : 14/041418
DATED : October 13, 2015
INVENTOR(S) : Mark David Griswold et al.

Page 1 of 1

It is certified that error appears in the above-identified patent and that said Letters Patent is hereby corrected as shown below:

In the claims

Column 17, line 2, replace "port scheduling" with "port; scheduling".

Signed and Sealed this
Sixteenth Day of February, 2016

Michelle K. Lee
*Director of the United States Patent and Trademark Office*